(12) United States Patent
Lee et al.

(10) Patent No.: US 8,038,786 B2
(45) Date of Patent: Oct. 18, 2011

(54) COMPOSITION FOR CUTTING OFF HEAT-RAY, FILM FORMED THEREFROM, AND METHOD FOR FORMING THE COMPOSITION AND THE FILM

(75) Inventors: Hae-Wook Lee, Daegu (KR); Jin-Hong Park, Daegu (KR)

(73) Assignee: Hae-Wook LEE, Daebong-dong (KR)

( * ) Notice: Subject to any disclaimer, the term of this patent is extended or adjusted under 35 U.S.C. 154(b) by 798 days.

(21) Appl. No.: 10/521,025

(22) PCT Filed: Mar. 17, 2003

(86) PCT No.: PCT/KR03/00516
§ 371 (c)(1),
(2), (4) Date: Jul. 26, 2005

(87) PCT Pub. No.: WO2004/083319
PCT Pub. Date: Sep. 30, 2004

(65) Prior Publication Data
US 2006/0021548 A1 Feb. 2, 2006

(51) Int. Cl.
*C04B 14/00* (2006.01)
*B05D 3/02* (2006.01)
*B05D 3/06* (2006.01)
*B32B 5/16* (2006.01)

(52) U.S. Cl. .............. 106/287.19; 106/400; 106/425; 106/441; 106/455; 428/323; 428/328; 428/402; 428/403; 427/372.2; 427/385.5; 427/487; 427/508

(58) Field of Classification Search .................. None
See application file for complete search history.

(56) References Cited

U.S. PATENT DOCUMENTS

| | | | |
|---|---|---|---|
| 48,067 A | | 6/1865 | Howard |
| 5,807,511 A | * | 9/1998 | Kunimatsu et al. ........... 252/587 |
| 6,632,274 B2 | * | 10/2003 | Kawamoto et al. ........ 106/286.4 |
| 6,992,431 B2 | * | 1/2006 | Ito et al. ........................ 313/478 |
| 7,494,710 B2 | * | 2/2009 | Ishihara et al. .............. 428/402 |
| 2002/0090507 A1 | | 7/2002 | Barth et al. |

FOREIGN PATENT DOCUMENTS

| | | |
|---|---|---|
| JP | 56-156606 | 12/1981 |
| JP | 58-117228 | 7/1983 |
| JP | 63-281837 | 11/1988 |
| JP | 06-257922 | 9/1994 |
| JP | 06-262717 | 9/1994 |
| JP | 06-316439 | 11/1994 |
| JP | 07-024957 | 1/1995 |
| JP | 07-070363 | 3/1995 |
| JP | 07-070445 | 3/1995 |
| JP | 07-070481 | 3/1995 |
| JP | 07-070842 | 3/1995 |
| JP | 08-041441 | 2/1996 |
| JP | 08-275857 | 10/1996 |
| JP | 08-281860 | 10/1996 |
| JP | 09-108621 | 4/1997 |
| JP | 09-151203 | 6/1997 |
| JP | 09-310031 | 12/1997 |
| JP | 09-316115 | 12/1997 |
| JP | 09-316363 | 12/1997 |
| JP | 09-324144 | 12/1997 |
| JP | 10-100310 | 4/1998 |
| JP | 2000007936 A * | 1/2000 |
| JP | 2000-169765 | 6/2000 |
| JP | 2001-240769 | 9/2001 |
| JP | 2002-020107 | 1/2002 |
| JP | 2002216543 A * | 8/2002 |
| JP | 2003-054947 | 2/2003 |
| KR | 10-1997-0062235 | 11/1997 |
| KR | 10-1999-0013946 | 4/1999 |
| KR | 10-0427147 | 4/2004 |

OTHER PUBLICATIONS

International Search Report.

* cited by examiner

*Primary Examiner* — Monique Jackson
(74) *Attorney, Agent, or Firm* — Harness, Dickey & Pierce, P.L.C.

(57) ABSTRACT

Disclosed are heat-ray cutoff compounds, films and method using them. The heat-ray compound is produced by dispersing conductive nanoparticles in an amphoteric solvent with acids and dispersion sol, which provides a low cost production for the heat-ray cutoff films because it is able to any resin binder without sorting the kinds of resin binders (hydrolic or alcoholic, or anti-hydrolic).

23 Claims, 5 Drawing Sheets

COMPOSITION FOR CUTTING OFF HEAT-RAY, FILM FORMED THEREFROM, AND METHOD FOR FORMING THE COMPOSITION AND THE FILM

TECHNICAL FIELD

The present invention relates to compositions for cutting off heat rays, and more particularly, to compositions for cutting off heat rays (while being compatible with a hydrolic (aqueous) resin binder, an alcoholic resin binder, or an antihydrolic (non-aqueous) resin binder), films formed therefrom, and methods of forming them.

BACKGROUND ART

Transparent films effective in screening heat is advantageous to be associated with means for preventing malfunctions of integrated circuits or electronic components, or for reducing the costs for cooling and heating by lessening the amount of solar energy going in and out of rooms and automobiles through windows. In addition, it is possible to offer effects of screening infrared rays when they are applied to various products such as optical fibers, sun visors, PET vessels, packaging films, glasses, textile goods, peep holes of heaters, heating apparatuses, and so on.

There has been proposed several films, which is capable of transmitting light with the wavelength of 380~780 nm in a visible right range while reflecting light with the wavelength of 800~2500 nm around the range of infrared lays, formed by the methods of: (1) forming a film with ingredients of tin oxide and antimony oxide by means of a spray process (refer to JP03-103341); (2) forming a film of tin-doped indium oxide (hereinafter, "ITO") on a glass substrate by means of physical vapor deposition, chemical vapor deposition, or sputtering; and (3) coating an near-infrared absorber in the type of organic dyestuffs, such as pthalocyannine series, anthraquinone series, naphtoquinone series, cyanine series, naphtaloctannine series, condensed azo polymers, and pyrrol series, on a substrate by means of an organic solvent and an organic binder, or transform the about-infrared absorber into a coating.

However, the method (1) needs a thick film because it has weak performance for screening heat rays, resulting in a low transmittance rate for visible light. The method (2) consumes a high product cost because it needs an apparatus with control of the atmosphere in high vacuum and accuracy, being restricted in sizes of coating films and shapes and disadvantageous to implementation due to insufficient mass-productivity. The method (3) is insufficient in advancing the heat cutoff efficiency because it has a low transmittance rate for visible light and dark colors and is restricted to absorb near-infrared rays with wavelengths 690~1000 nm. While the methods (1) and (2) are available to cut off ultraviolet rays as well as heat rays, they are incapable of receiving electric waves from mobile phones, televisions, or radios, because their materials reflects the electric waves due to small surface resistance, i.e., high electrical conductance.

In order to overcome the problems, there have been proposed several techniques disclosed in Japanese Patent NOs. JP56-156606, JP58-117228, and JP63-281837, in which respectively an antimony-doped tin oxide (hereinafter, referred to as "ATO") is mixed with a resin binder, ATO is directly added to a resin binder dissolved in an organic solvent, and a coating compound manufactured by adding an organic binder and tin oxide nanoparticles into a splittable surfactant is deposited to form a heat-ray cutoff film. But it still needs a thick film enough to perform an infrared ray cutoff function, which contains low transmittance rate for a visible light to lower the transparency.

On the other hand, Japanese Patent NOs. JP07-24957, JP07-70363, JP07-70481, JP07-70842, JP07-70445, and JP08-41441 disclose the methods in which; a powder with an excellent performance of screening heat rays is made by processing or manufacturing ITO nanoparticles in the atmosphere of inert gas; and a heat cutoff film formed by mixing organic/inorganic binders with a dispersion sol made from using water or an alcoholic solvent without using an organic solvent, capable of screening heat rays over 90% under the condition of wavelength 100 nm. However, as the ITO nanoparticles is ingredient of a highly expensive indium and obtained by processing twice in the atmosphere of inert gas, it is limited in practical implementation due to the high product cost. Moreover, the ITO nanoparticles cause delamination or cohesion when they are mixed with a ultraviolet-hardening resin binder and is in poor preservation.

Japanese Patent NOs. JP09-324144, JP09-310031, JP09-316115, JP09-316363, JP10-100310, and JP12-169765 propose the method of mixing a dispersion sol of the first heat-ray cutoff nanoparticles and the second heat-ray cutoff compound (the near-infrared absorber or 6-boronic nanoparticles), or mixing respective coating compounds. However, in this case, it has disadvantages that a visible ray transmittance rate is remarkably degraded or it is not easy to induce dispersion while manufacturing a dispersion sol of the second heat-ray cutoff compound, which disables a low cost mass-production for the heat-ray cutoff films.

Japanese Patent NOs. JP06-262717, JP06-316439, JP06-257922, JP08-281860, JP09-108621 and JP09-151203, and U.S. Patent Publication NO. 2002/0090507 disclose the methods of forming an organic solvent dispersion sol of an ATO water dispersion sol and an organic ATO (i.e., enhancing co-usability to an organic solvent by converting a hydrophilic surface of an ATO into a hydrophobic surface) and of forming heat-ray cutoff coating films respective to a hydrolic binder and an organic resin binder. However, the water ATO sol is insufficient in co-usability with an organic resin binder, and the organic ATO sol is insufficient in co-usability with a hydrolic resin binder. Further, the organic ATO sol needs a secondary process to change the hydrophilic surface into the hydrophobic surface, which causes an increase of the product cost.

Therefore, it is desired to develop an improved coating film having excellent property for cutting off heat rays.

DISCLOSURE OF INVENTION

An object of the present invention is to provide a heat-ray cutoff compound having a high transmission rate for visible light while exhibiting an improved property of cutting off heat rays and a method of forming the same by means of utilizing conductive nanoparticles that are effective in cutting off heat rays.

Another object of the present invention is to provide a method of forming a coating film and formative substance by means of depositions or general forming techniques with conductive nanoparticles, that is effective in screening heat rays, and the coating film and formative substance manufacture by the method, in low cost.

In order to accomplish the above objects of the present invention, the present invention is characterized in providing a heat-ray cutoff compound, i.e., a dispersion sol, which is formed by dispersing conductive nanoparticles in an amphoteric solvent in high concentration without an additional step for manufacturing powder to turn the nanoparticles into a hydrophobic condition, being good for commercial co-usability. The dispersion sol produced as such is efficient to manufacturing a heat-ray cutoff film and a formative object in low cost with excellent stability and co-usability to hydrolic or alcoholic resin binders and anti-hydrolic resin binders.

According to the present invention, it overcomes a problem of co-usability to hydrolic or alcoholic resin binders and anti-hydrolic resin binders by dispersing hydrophobic-surfaced conductive nanoparticles in an amphoteric solvent, capable of resulting in the form of a coating film, a film, or other formative objects, enhancing visible light transmittance, heat-ray cutoff property, endurance of wearing and weathering, low cost as well.

A compound advanced by the present invention is good for preservation stability, and provides high visible light transmittance rate and heat-ray cutoff property when it is hardened after being deposited on various films, plastic objects, or glass.

In addition, as the conductive nanoparticles such as ITO, ATO and AZO are dispersed in the amphoteric solvent, it can be easily hardened by an ultraviolet or an electronic ray even with using a hydrolic or alcoholic resin binder as well as an organic resin binder. Further, it is able to manufacture a film by way of heat or normal-temperature hardening processes.

The present invention improves the co-usability of the heat-ray cutoff film to hydrolic or alcoholic resin binders and anti-hydrolic resin binders, and provides an amphoteric solvent that enables a coating compound to be adaptable to processes of normal-temperature hardening, heat hardening, ultraviolet or electronic ray hardening. By adding a hydrolic or alcoholic resin binder, or anti-hydrolic resin binder into such an amphoteric solvent dispersion sol, a heat-ray cutoff film or a formative object thereof is manufactured. A production cost is cheaper than before because it does not need a secondary process for a water dispersion sol in order to use the anti-hydrolic resin binder.

BEST MODE FOR CARRYING OUT THE INVENTION

Manufacturing a Bilaternal Solvent Dispersion Sol

1. Conductive Nanoparticles

Figure 1:
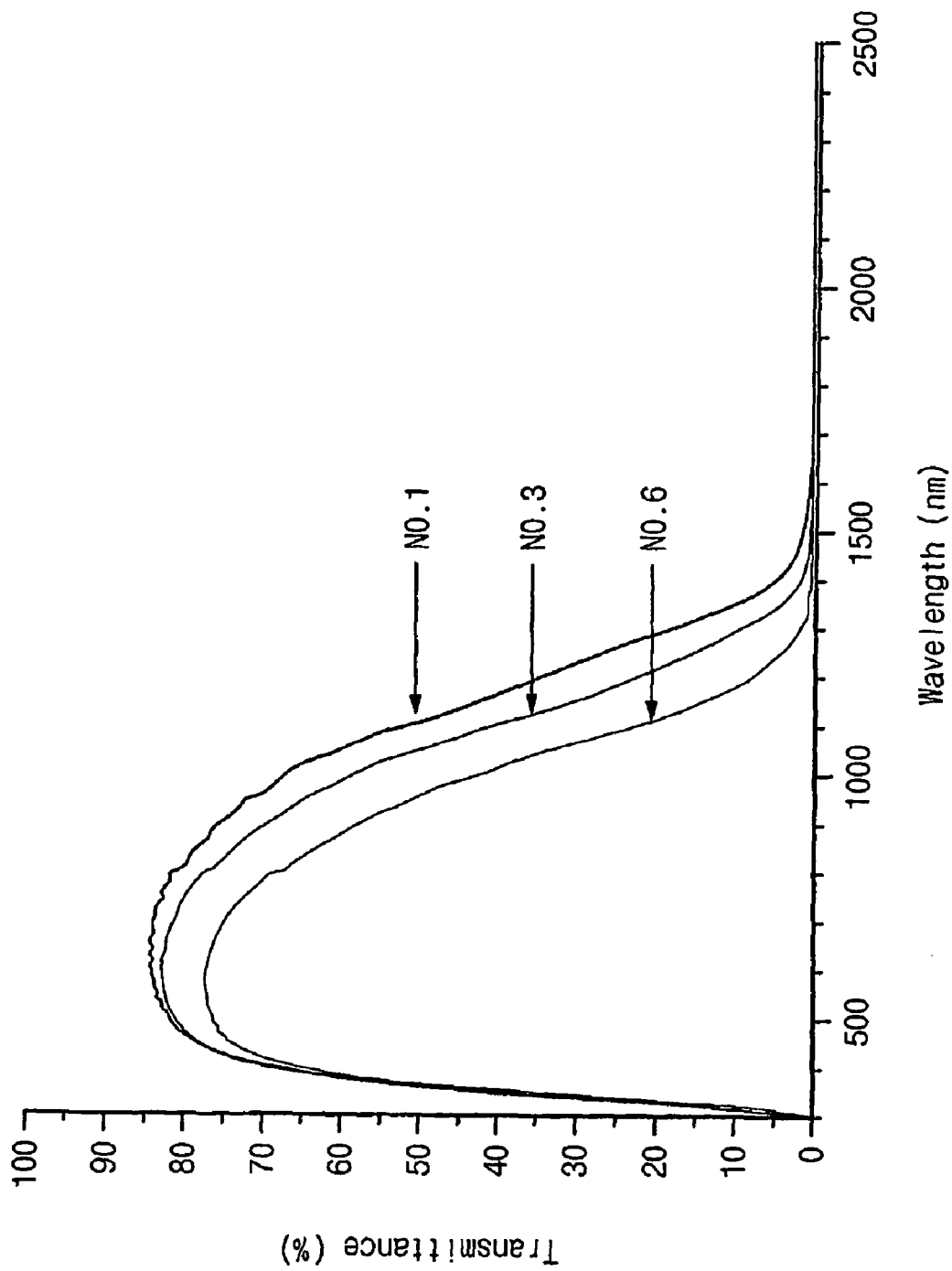
FIG. 1 illustrates a profile of light transmission spectrum for a coating film containing an ITO, which is obtained from Example 3.

Conductive nanoparticles of the present invention were used with nanoparticles of metal oxides having excellent conductivity, such as ATOs, ITOs, and antimony-doped zinc oxides (AZOs). The metal oxide nanoparticles have grain diameters under 200 nm, preferably under 100 nm, more preferably in the range of 10~80 nm, and the nanoparticles are dispersed into an amphoteric solvent such that particles more than 60% have their diameters within 100 nm. Small particles under 200 nm do not induce the dispersion in the range of visible light, retaining the transparency of the coating film. For the compound in use of forming a coating film to screen heat rays, by the present invention, conductive nanoparticles, such as ATO, ITO, AZO, and so on, were used with varying a fine component ratio of powder in accordance with necessity. The conductive nanoparticles are manufactured by means of a general method, accompanying with a product made by PMT Co., Keeling & Walker Co., Nano Korea Co., and so on, or a compound power having an appropriate fine component ratio.

While there is no limit to the amount of the conductive nanoparticles used in the dispersion of the amphoteric solvent, it is exhorted to be established in the range of 1~80 wt %, preferably in the range of 20~60 wt %.

2. Amphoteric Solvent

It is generally frequent for a solvent to be used in dispersion of the conductive nanoparticles to employ a polarized organic solvent such as water or alcohol, or a non-polarized organic solvent such as toluene or xylene. If a solvent of a dispersion sol manufactured by the above condition is a polarized solvent like water or alcohol, it is unable to be adoptable to anti-hydrolic resin binder. To the contrary, if a solvent of a dispersion sol is a non-polarized organic solvent, it is unable to be adoptable to hydrolic resin binder. Therefore, there has been a limit in application because it was impossible to use a single dispersion sol for a variety of resin binders. Further, as a powder surface in the conductive nanoparticles shows its hydrophilic property, it needs a process for manufacturing an additional powder to convert the powder surface into a hydrophobic property for the dispersion of non-polarized organic solvent, which raises a time and cost for that.

Therefore, the present invention makes it enable to be used by mixing the nanoparticles with all kinds of resin binders without processing such a secondary treatment for converting the powder surface of the conductive nanoparticles into a hydrophobic property, by manufacturing a dispersion sol from using the amphoteric solvent. There are many kinds to be usable as the amphoteric solvent adoptable to the dispersion of the conductive nanoparticles, such as ethylene glycol monomethyl ether, ethylene glycol monoethyl ether, ethylene glycol monopropyl ether, ethylene glycol monobutyl ether, so on, but other kinds of the amphoteric solvents may be also available without limitation on the above composites. While there is no limit to the amount of the solvent used in the dispersion of the amphoteric solvent, it is exhorted to be established in the range of 20~99 wt %, preferably in the range of 50~80 wt %.

3. Additive

When the conductive nanoparticles are dispersed in the amphoteric solvent, it is available to add several additives, such as a surface charge mediating agent and a dispersing agent, in order to enhance the efficiency of the surface property and dispersion of the dispersion sol formed therein.

(1) Surface Charge Mediating Agent: Dispersion by Electrostatic Repulsion.

The conductive nanoparticles have charges on their surfaces in the dispersion sol. The surface charge mediating agent can make the surface charges be stronger and all the nanoparticles have the same charges. Counter-ions surround the surface charges of the nanoparticles to form electrical double layers. As the double layers are thicker, the dispersion sol becomes more stable.

While an isoelectric point of the surface in the conductive nanoparticles used in the present invention is variable in accordance with kinds and states of the nanoparticles, ATO has pHipe=3.7 and ITO has pHipe=8.5. Thus, a suspension is stabilized in the conditions of pH>8 in ATO, while of pH<6 in ITO. The amount and kind of the surface charge mediating agent are preferred to be set in concordance with a dispersion condition because they are variable in accordance with the composition, the kinds and the additive amount of the nanoparticles. When an hydrochloric acid is used as a surface charge mediation agent for an ATO containing antimony of 10 wt %, it is available to use an acid of $5 \times 10^{-4}$-$3.5 \times 10^{-3}$ g per a nanoparticle of 1 g.

The ITO nanoparticles has an isoelectric point higher different from the ATO nanoparticles and the mediation on the surface charges are determined in accordance with an object and use of the dispersion sol. In manufacturing a dispersion sol with a high concentration and a low viscosity, it is preferred to process it with a dispersing agent after dispersing the particles in the amphoteric solvent without mediating the surface charges. The kinds of acids usable in the present invention are organic acids, inorganic acids, and polymeric acids. The organic acids include acetic acids or glacial acetic acids, while the inorganic acids include hydrochloric acids, nitric acids, phosphoric acids, sulfuric acids, and so on. The polymeric acids include polyacrylic acids as an example. The kinds of the acids are not limited in the above and others are available thereto.

(2) Dispersing Agent: Dispersion by an Effect of Steric Hindrance.

A dispersing agent effective in the steric hindrance has two distinctive structures as follows.

a. The dispersing agent is able to be absorbingly adhesive to the surfaces of the conductive nanoparticles, retaining strong adhesion to a surface of a pigment because it has one or more functional radicals having affinities for the conductive nanoparticles.

b. With hydrocarbon entities good for co-usability, after being absorbed on the conductive nanoparticles, the hydrocarbon entities dangle from the amphoteric solvent around the conductive nanoparticles. Such a state, where the hydrocarbon entities are hanging down from the amphoteric solvent and absorbed on the surfaces of the conductive nanoparticles, is called steric hindrance or entropic stabilization.

Interactions between polymeric portions of the dispersion agent and the amphoteric solvent make envelopes around the conductive nanoparticles thicker, enforcing the stability thereof. Such stabilization enables the dispersion sol to be adaptable to all the hydrolic resin binders partially using the anti-hydrolic resin binders and solvents. The dispersing agent is assistant to a procedure of dispersing the conductive nanoparticles into the amphoteric solvent, or is assistant to a procedure of dispersing the conductive nanoparticles into the amphoteric solvent together with the surface charge mediating agent. Accordingly, the dispersion agent is effective in reducing the viscosity, preventing re-cohesion of the nanoparticles, by maintaining distances between the nanoparticles due to the electrostatic repulsion or the steric hindrance arising from the absorption to the dispersion sol dispersed into the amphoteric solvent.

The dispersing agent is classified into one type having an amine radical and another type having an acid radical. In detail, available dispersing agents include anti-terra-203, anti-terra-204, anti-terra-205, anti-terra-206, anti-terra-U, anti-terra-U100, anti-terra-U80, BYK-154, BYK-220S, BYK-P104, BYK-P104S, BYK-P105, BYK-9075, BYK-9076, BYK-9077, Byklumen, Disperbyk, Disperbyk-101, Disperbyk-102, Disperbyk-103, Disperbyk-106, Disperbyk-107, Disperbyk-108, Disperbyk-110, Disperbyk-111, Disperbyk-112, Disperbyk-115, Disperbyk-116, Disperbyk-130, Disperbyk-140, Disperbyk-142, Disperbyk-160, Disperbyk-161, Disperbyk-162, Disperbyk-163, Disperbyk-164, Disperbyk-166, Disperbyk-167, Disperbyk-169, Disperbyk-170, Disperbyk-171, Disperbyk-174, Disperbyk-176, Disperbyk-180, Disperbyk-181, Disperbyk-182, Disperbyk-183, Disperbyk-184, Disperbyk-185, Disperbyk-187, Disperbyk-190, Disperbyk-191, Disperbyk-192, Disperbyk-2000, Disperbyk-2001, Disperbyk-2050, Disperbyk-2070, Disperbyk-2150, Lactimon, Lactimon-WS, and so on (BYK Chemie GmbH).

The coating film using the amphoteric solvent dispersion sol manufactured by the method of the present invention is a high surface resistance over $1 \times 10^6$ $\Omega \cdot cm$, which is advantageous to be adoptable to audio systems of various communication apparatuses and in automobiles because it is capable of transmitting radio frequencies emitted from mobile phones, televisions, or radios. The amount used in the dispersing agent is 1~30 wt % in weight ratio to the conductive nanoparticles.

4. Photopolymerization Initiator

It is available to add a photopolymerization initiator for the purpose of easily hardening the dispersion sol of the present invention when it is exposed to chemical rays (ultraviolet, electronic ray). Such photopolymerization initiators include 1-hydroxy-cyclo-hexyl-phenyl-ketone, benzyl-dimethyl-ketal, hydroxyl-dimethyl-acetophenone, benzoin, benzoin-methyl-ether, benzoin-isopropyl-ether, benzoin-butyl-ether, benzyl, benzophenone, 2-hydroxy-2-methylpropiophenone, 2,2-dietoxy-ethophenone, antraquinone, chloro-antraquinone, etylantraquinone, butylantraquinone, 2-chlorothyoksantone, alpha-chloromethylnaphthalene, and anthracene. In detail, there are Lucirin (Basf Co.), Darocur MBF, Igacure-184, Igacure-651, Igacure-819, Igacure-2005 (Ciba Geigy Co.), and so on. It is possible to combine at least one agents among the photopolymerization initiators proposed above. A ratio of the photopolymerization initiators is preferred to be 0.1.about.10 wt % to 100 wt % of the dispersion sol, preferably 1~5 wt %.

[Heat-Ray Cutoff Coating Film]

1. Resin Binder

Although without a specific limitation in the kinds of the resin binders composing compounds of the coating films, it is preferable to use one capable of forming a coating film with excellent transparency, and possible to select one or more two kinds in accordance with the condition of hardening such as ultraviolet hardening when there is co-usability between the resin binders. The hydrolic resin binders include water-soluble alkyd, polyvinylalcohol and polybutylalcohol, and hydrolic emulsion-type resin binders include acrylyl, acrylylstylene, and super-acid vinyl. Alcoholic resin binders include polyvinylbutyral and polyvinylacetal. Anti-hydrolic heat-hardening resin binders include acrylyl, polycarbonate, polychloride vinyl, urethane, melamine, alkyd, polyesther, and epoxy, while ultraviolet-hardening resin binders include epoxy acrylylate, polyether acrylylate, polyesther acrylylate, and urethane-metamorphosed acrylylate.

The amount used in the resin binder is 1~95 wt % for 100 wt % of a coating compound, preferably about 5~40 wt %.

2. Manufacturing Heat-Ray Cutoff Coating Solution

It is able to easily produce a heat-ray cutoff coating compound with superior properties in visible right transmission and heat-ray cutoff in low cost by mixing the resin binder with a sol obtained by dispersing the conductive nanoparticles in the amphoteric solvent.

It is permissible to set a compounding ratio of the conductive nanoparticles dispersion sol and the resin binder from 97:3 to 30:70 in weight ratio, preferably 95:5 through 70:30.

[Property of Heat-Ray Cutoff Coating Film]

There are a variety of ways to coat a compound characterized for screening heat rays, such as spin coating, deep coating, roll coating, bar coating, screen printing, photogravure, microgravure, offset, and so on.

A heat-ray cutoff coating film produced by the present invention has a structure that the conductive nanoparticles are uniformly distributed in a hydrolic or alcoholic, or anti-hydrolic resin binder. Such a heat-ray cutoff coating film displays its function of screening heat rays higher along much conductive nanoparticles used therein under the same conditions with the kinds of apparatus, conductive nanoparticles and additive. With the same amount of the conductive nanoparticles and the same amount of the additive, it is inclined to make an effect of screening heat rays higher as the conductance of the conductive nanoparticles, i.e., specific resistance is lower. For example, ATO nanoparticles, which has conductance variable dependent on an engagement ratio of antimony therein, is preferred to have its specific resistance under 10 $\Omega \cdot cm$, preferably under 3.0 $\Omega \cdot cm$. Here, the best feature of screening heat rays appears from an ATO containing antimony of 10 wt % that corresponds to the lowest specific resistance.

However, it is also inclined to cause a visible light transmission rate to be increased in accordance with an increase of the amount of antimony. Along the increase of antimony, a color of the ATO nanoparticles powder goes to pale blue-gray from blue-gray, from which a color of a coating film changes to yellowish green from blue. These changes of colors causes an absorption peak value to vary around a wavelength of 550 nm, which makes it predictable to change the visible light transmission rate. The absorption for a visible light is higher in a blue series while lower in a yellow series.

[Evaluation for Heat-Ray Cutoff Coating Film]

The coating film produced by the present invention was evaluated by means of the methods as follows.

1. Optical Characteristic

A transmittance was carried out for light in the range of 200 nm through 2500 nm by means of UV/VIS/NIR Spectrometer (CARY 5G, Varian Co.).

(1) Visible Light Transmittance (VLT):

The visible light transmittance was represented in a value obtained by calculating a ratio of a transmitted pencil to an incident pencil of sunlight on the standard of ASTM E903-82 (JIS R 3106, KS L2514), after measuring spectrum transmittance at 41 wavelength points every 10 nm in the range from 380 nm to 780 nm by means of a spectrum photometer. The sunlight means a distribution of relative spectro-illumination in the scope of mixed direct and scattered light, as composite sunlight for designing illumination offered by International Commission on Illumination (CIE). The pencil means a wavelength integral with a product of spectro-emission flux and spectro-luminous efficiency.

(2) IR Cutoff

The IR cutoff represents an area ratio excepting an integral value of a transmitted area over the overall size after measuring a transmittance in the range of wavelength 800~1800 nm by means of a spectrum photometer.

2. Endurance Against Wearing (Measuring Surface Hardening)

Pencil hardening intensity (pencil hardness) was measured on the standard of JIS K5651-1966.

3. Adhesion Property

A laminate test was performed with a cross-cut cellotape for a hardened coating film.

In detail, a cellotape attaches and strip off three times from the coating film in which cutout lines reaching a substrate are inserted in the pitch of 1 mm with hundred scales of 1 $mm^2$, the cutout lines being arranged crosswise and lengthwise in number of 11.

∘: No lamination of a crosslinked hardened coating film.
Δ: The case that the number of lamination scales is 1~50.
x: The case that the number of lamination scales is 51~100.

4. Surface Smoothness

Monitoring flatness of the coating film, after being hardened, by means of vision or an electro-microscopy was carried out.

∘: Excellent as like a mirror face
Δ: Some disordered on the surface
x: So many wrinkles on the surface 5. Weatherability It represented that "∘" corresponds to when visible light and sunlight transmittance retain over 80% of their initial values contemporaneously, after illuminating for 2000 hours in a carbon arc sunshine weathermeter, while "x" corresponds when under 80% of their initial values.

6. Preservation Stability

It represented deterioration along a lapse of time in accordance with variations of phase separation, cohesion, and an increase of viscosity.

[Manufacturing Dispersion Sol of Conductive Nanoparticles]

Example 1

After mixing ITO nanoparticles (Nano Korea Co.) of 40~80 g with an amphoteric solvent of 120~160 g, zirconia balls were charged up to 50 vol % and then dispersed in the mixed solution for 24 hours. And, disperbyk-180 (BYK Chemie Co.), as a dispersing agent, of 2~10 g was added thereto and uniformly mixed therewith by an agitator, so that a high performance ITO nanoparticles dispersion sol was obtained with good co-usability to hydrolic or alcoholic, or anti-hydrolic resin binders. In the case of mixing the ITO nanoparticles with an ultraviolet hardening resin binder, a photoinitiator Irgacure 184 (Ciba Geigy Co.) of 1~5 g was added thereto to obtain the dispersion sol.

Comparison 1

A dispersion sol was obtained from the same processing conditions but a solvent for dispersion was an alcohol (methanol, ethanol).

Example 2

After mixing HCl of $5 \times 10^{-4}$~$3.5 \times 10^{-3}$ g, for adjusting pH concentration, with a solution composed of ATO nanoparticles (Keeling & Walker Co.), which contain antimony of 5, 10, 15 and 20% in weight ratio, and an amphoteric solvent of 120~160 g, zirconia balls were charged up to 50 vol % and then dispersed in the mixed solution for 24 hours to control surface charges of the nanoparticles. And, Anti-Terra-U100 (BYK Chemie Co.), as a dispersing agent, of 2~10 g was added thereto and uniformly mixed therewith by an agitator, so that a high performance ATO nanoparticles dispersion sol was obtained with good co-usability to hydrolic or alcoholic, or anti-hydrolic resin binders. In the case of mixing the ATO nanoparticles with an ultraviolet hardening resin binder, a photo-initiator Irgacure 184 (Ciba Geigy Co.) of 1~5 g was added thereto to obtain the dispersion sol.

Comparison 2

A dispersion sol was obtained from the same processing conditions but a solvent for dispersion was an organic solvent (toluene, benzene).
[Manufacturing Coating Compound]

Example 3

A ultraviolet hardening heat-ray cutoff coating solution was obtained by uniformly mixing the ITO nanoparticles dispersion sol with a hardening deposition film, which had been made from an ultraviolet hardening resin (solid powder 100%, SK-UCB Co.) of acrylate series, in an agitator, after adjusting a volume ratio on conductive nanoparticles:binder=5:95~80:20.

A heat-ray cutoff film was obtained from that after coating a heat-ray cutoff coating compound on a polycarbonate substrate with thickness of 125 μm in powder thickness of 0.5~5 μm by means of Meyer Rod #6~10, the solvent was evaporated by hot air and then the coating film was hardened by being irradiated with a high-pressure mercury lamp of 100 W in a conveying velocity of 20 m/min.

The following Table 1 arranges resulting data evaluated by the aforementioned test methods for various ITO heat-ray cutoff films manufactured by the above processes.

of other heat-ray cutoff films (the comparisons 1 and 2), but similar in the visible light transmittance (VLT) and the heat cutoff rate (IR-C).

FIG. 1 depicts profiles of light transmission spectrums of the coating films for the samples #1, 3 and 6 shown in Table 1. As illustrated, they show high performance of screening infrared rays and visible light transmission.

Example 4

A ultraviolet hardening heat-ray cutoff coating solution was obtained by uniformly mixing the ATO nanoparticles dispersion sol of Example 2 with a hardening deposition film, which had been made from an ultraviolet hardening resin (solid powder 100%, SK-UCB Co.) of acrylate series, in an agitator, after adjusting a volume ratio on conductive nanoparticles:binder=15:85~80:20.

1) Coating Meyer Rod

A heat-ray cutoff film was obtained from that after coating a heat-ray cutoff coating compound on a polyethyleneteleph-talate (PET) substrate with thickness of 25 μm or a polycarbonate substrate with thickness of 125 μm in powder thickness of 0.5~5 μm by means of Meyer Rod #6~10, the solvent was evaporated by hot air and then the coating film was hardened by being irradiated with a high-pressure mercury lamp of 100 W in a conveying velocity of 20 m/min. The following Table 2 arranges resulting data evaluated by the

TABLE 1

[ITO heat-ray cutoff films]

| Sample No. | ITO (Vol %) | Resin Binder (Vol %) | Disp. Sol. | Meyer Rod # | VLT | IR-C | Adhesion | Pencil Intensity | Sub. | Pres. stability |
|---|---|---|---|---|---|---|---|---|---|---|
| 1 | 3.32 | 37.00 | EGPE | 10 | 83.4 | 70.5 | 0 | 2H↑ | PC | 0 |
| 2 | 3.92 | 27.27 | EGBE | 10 | 82.1 | 75.1 | 0 | 2H↑ | PC | 0 |
| 3 | 4.20 | 22.73 | EGEE | 10 | 82.3 | 75.9 | 0 | 2H↑ | PC | 0 |
| 4 | 4.48 | 18.18 | EGPE | 10 | 81.8 | 77.6 | 0 | 2H↑ | PC | 0 |
| 5 | 4.64 | 15.45 | EGME | 10 | 82.4 | 77.0 | 0 | 2H↑ | PC | 0 |
| 6 | 4.79 | 13.06 | EGEE | 10 | 76.9 | 83.1 | 0 | 2H↑ | PC | 0 |
| 7 | 4.97 | 10.23 | EGPE | 10 | 77.5 | 81.1 | 0 | 2H↑ | PC | 0 |
| 8 | 5.04 | 9.09 | EGBE | 10 | 77.7 | 80.9 | 0 | 2H↑ | PC | 0 |
| Comp. 1 | 1.81 | 61.55 | MeOH | 10 | 86.0 | 59.2 | — | — | PC | x |
| Comp. 1 | 4.64 | 15.45 | EtOH | 10 | 82.4 | 77.0 | — | — | PC | x |

*EGME: ethylene glycol monomethyl ether, EGEE: ethylene glycol monoethyl ether, EGPE: ethylene glycol monopropyl ether, EGBE: ethylene glycol monobuthyl ether, MeOH: methyl alcohol, EtOH: ethyl alcohol.

As can be seen from Table 1, the heat-ray cutoff films (the samples 1~8 has the preservation stabilities better than those aforementioned test methods for ATO heat-ray cutoff films manufactured by the above processes.

TABLE 2

[ATO heat-ray cutoff films]

| Sam. No. | ITO Vol % | Resin Binder Vol % | Sol. | Acid | Meyer Rod # | VLT | IR-C | Adhesion | Pencil Intensity | Sub. | Preserv. stability |
|---|---|---|---|---|---|---|---|---|---|---|---|
| 9 | 3.30 | 13.15 | EGEE | HCL | 10 | 77.5 | 71.5 | 0 | 2H↑ | PET | 0 |
| 10 | 3.41 | 10.25 | EGPE | AcOH | 10 | 75.7 | 72.59 | 0 | 2H↑ | PET | 0 |
| 11 | 3.50 | 8.17 | EGBE | $HNO_3$ | 10 | 73.8 | 74.04 | 0 | 2H↑ | PET | 0 |
| 12 | 3.69 | 3.70 | EGBE | $H_3(PO_4)$ | 10 | 69.2 | 72.98 | 0 | 2H↑ | PET | 0 |
| 13 | 3.74 | 2.49 | EGPE | HCL | 10 | 72.8 | 74.30 | 0 | 2H↑ | PET | 0 |
| 14 | 3.78 | 1.65 | EGBE | HCL | 10 | 73.4 | 72.79 | 0 | 2H↑ | PET | 0 |
| 15 | 3.81 | 0.92 | EGME | HCL | 10 | 74.3 | 74.47 | 0 | 2H↑ | PET | 0 |

TABLE 2-continued

[ATO heat-ray cutoff films]

| Sam. No. | ITO Vol % | Resin Binder Vol % | Sol. | Acid | Meyer Rod # | VLT | IR-C | Ad-hesion | Pencil Intensity | Sub. | Preserv. stability |
|---|---|---|---|---|---|---|---|---|---|---|---|
| 16 | 4.31 | 9.09 | EGME | HCL | 7 | 73.5 | 71.3 | 0 | 2H↑ | PET | 0 |
| 17 | | | | | 8 | 73.9 | 71.5 | 0 | 2H↑ | PET | 0 |
| 18 | 4.47 | 15.45 | EGEE | HCL | 7 | 71.7 | 73.8 | 0 | 2H↑ | PET | 0 |
| 19 | | | | | 8 | 71.8 | 73.7 | 0 | 2H↑ | PET | 0 |
| 20 | 4.57 | 13.64 | EGBE | HCL | 7 | 72.3 | 74.0 | 0 | 2H↑ | PET | 0 |
| 21 | | | | | 8 | 71.2 | 74.3 | 0 | 2H↑ | PET | 0 |
| 22 | 4.68 | 11.82 | EGPE | HCL | 7 | 71.2 | 75.7 | 0 | 2H↑ | PET | 0 |
| 23 | | | | | 8 | 69.5 | 77.5 | 0 | 2H↑ | PET | 0 |
| 24 | 4.74 | 10.91 | EGEE | HCL | 7 | 71.6 | 73.8 | 0 | 2H↑ | PET | 0 |
| 25 | | | | | 8 | 70.6 | 75.2 | 0 | 2H↑ | PET | 0 |
| 26 | 4.79 | 10.00 | EGME | HCL | 7 | 72.1 | 73.0 | 0 | 2H↑ | PET | 0 |
| 27 | | | | | 8 | 69.9 | 78.3 | 0 | 2H↑ | PET | 0 |
| 28 | 4.85 | 9.09 | EGEE | HCL | 7 | 70.0 | 75.9 | 0 | 2H↑ | PET | 0 |
| 29 | | | | | 8 | 70.3 | 78.2 | 0 | 2H↑ | PET | 0 |
| 30 | 5.54 | 9.09 | EGME | HCL | 10 | 67.6 | 82.0 | 0 | 2H↑ | PET | 0 |
| 31 | | | | | 8 | 70.9 | 75.8 | 0 | 2H↑ | PET | 0 |
| 32 | 6.92 | 9.09 | EGME | HCL | 8 | 65.7 | 81.9 | 0 | 2H↑ | PET | 0 |
| Comp. 3 | 4.43 | — | toluene | HCL | — | — | — | — | — | — | — |
| Comp. 4 | 4.79 | — | xylene | HCL | — | — | — | — | — | — | — |
| Comp. 5 | 5.54 | — | bensene | HCL | — | — | — | — | — | — | — |

*EGME: ethylene glycol monomethyl ether, EGEE: ethylene glycol monoethyl ether, EGPE: ethylene glycol monopropyl ether, EGBE: ethylene glycol monobuthyl ether As can be seen from Table 2, the properties of the heat-ray cutoff films (the samples #9~32), which were formed by dispersing the conductive nanoparticles in the amphoteric solvent or the hydrochloric acid, are similar to those of the samples #1~8 shown in Table 1. In other words, while the former examples used solvents different in polarity, the present invention was able to obtain the similar results even with a resin binder belonging to the same series, i.e., an ultraviolet hardening resin. By the contrary, in the cases of the comparisons 3~5, the non-polarized organic solvent, like toluene, xylene, and benzene, and the hydrochloric acid did not effective in dispersing the ATO as the conductive nanoparticles. In order to conduct dispersion to a non-polarized organic solvent, it needs an additional process for manufacturing powder to change surfaces of the ATO nanoparticles into hydrophobic property.

Figure 2:
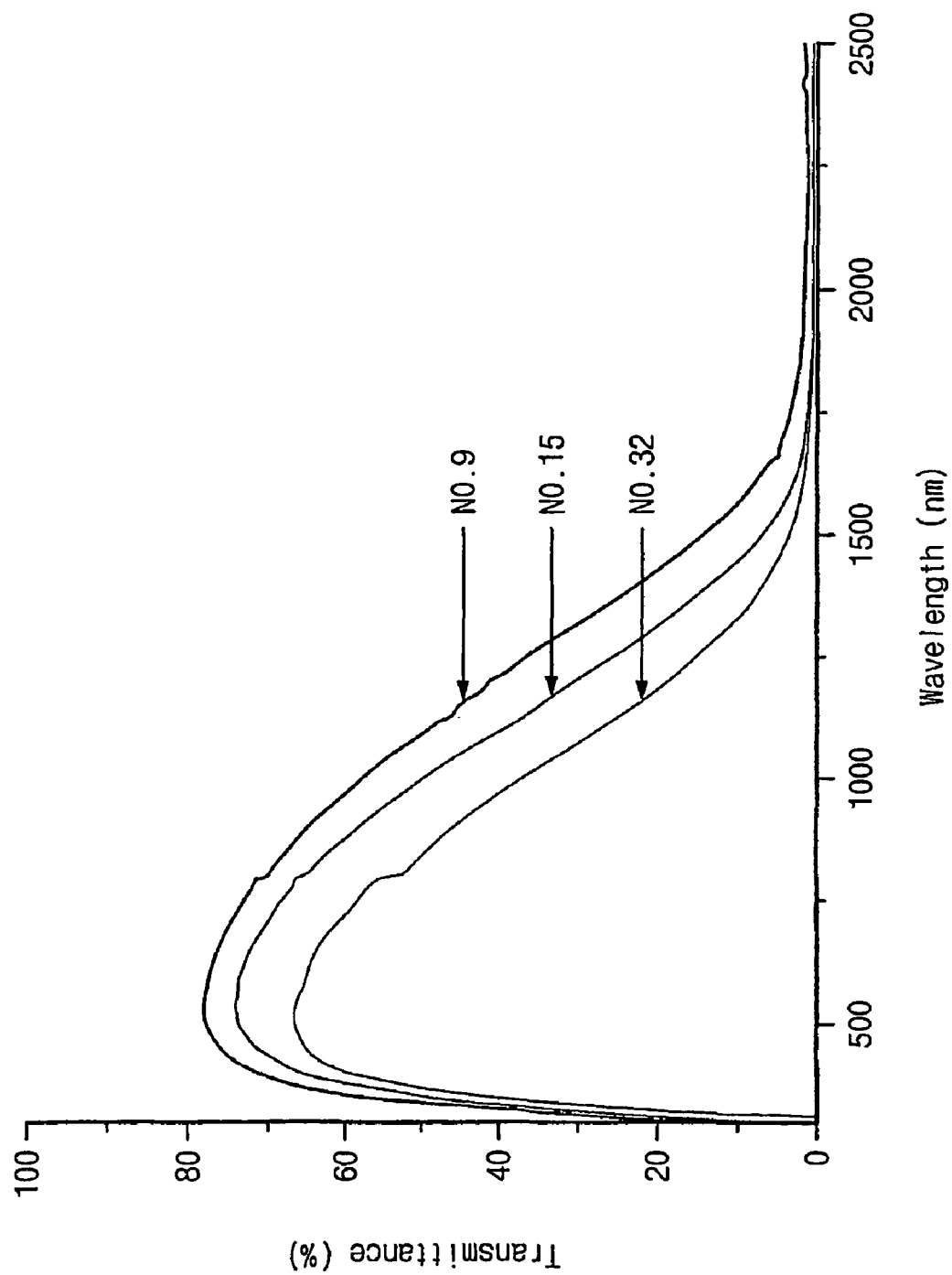
FIG. 2 illustrates a profile of light transmission spectrum for a coating film containing an ATO, which is obtained from Example 4.

FIG. 2 shows profiles of light transmission spectrums of the coating films for the samples #9, 15 and 32 shown in Table 2. As illustrated, they show high performance of screening infrared rays and visible light transmission.

The following Table 2 arranges resulting data evaluated by the aforementioned test methods for ATO heat-ray cutoff films in accordance with the content of antimony.

TABLE 3

[ATO film properties according to antimony (Sb) content]

| Sample No. | Sb (Vol %) | ATO (Vol %) | Resin Binder (Vol %) | Meyer Rod # | VLT | IR-C | Adhesion | Pencil Intensity | Sub. | Pres. stability |
|---|---|---|---|---|---|---|---|---|---|---|
| 33 | 5 | 4.58 | 13.64 | 8 | 75.8 | 67.6 | 0 | 2H↑ | PET | 0 |
| 34 | | 4.85 | 9.09 | 8 | 73.0 | 71.6 | 0 | 2H↑ | PET | 0 |
| 35 | 10 | 4.58 | 13.64 | 7 | 72.3 | 74.0 | 0 | 2H↑ | PET | 0 |
| 36 | | | | 8 | 71.2 | 74.3 | 0 | 2H↑ | PET | 0 |
| 37 | | 4.85 | 9.09 | 7 | 70.0 | 75.9 | 0 | 2H↑ | PET | 0 |
| 38 | | | | 8 | 70.3 | 78.2 | 0 | 2H↑ | PET | 0 |
| 39 | 15 | 4.58 | 13.64 | 7 | 76.1 | 67.3 | 0 | 2H↑ | PET | 0 |
| 40 | | | | 8 | 75.8 | 66.4 | 0 | 2H↑ | PET | 0 |
| 41 | | 4.85 | 9.09 | 7 | 76.1 | 68.1 | 0 | 2H↑ | PET | 0 |
| 42 | | | | 8 | 77.0 | 68.8 | 0 | 2H↑ | PET | 0 |
| 43 | | | | 10 | 70.9 | 76.4 | 0 | 2H↑ | PET | 0 |
| 44 | 20 | 4.58 | 13.64 | 8 | 78.0 | 64.6 | 0 | 2H↑ | PET | 0 |
| 45 | | 4.85 | 9.09 | 8 | 76.4 | 63.1 | 0 | 2H↑ | PET | 0 |

Figure 3:
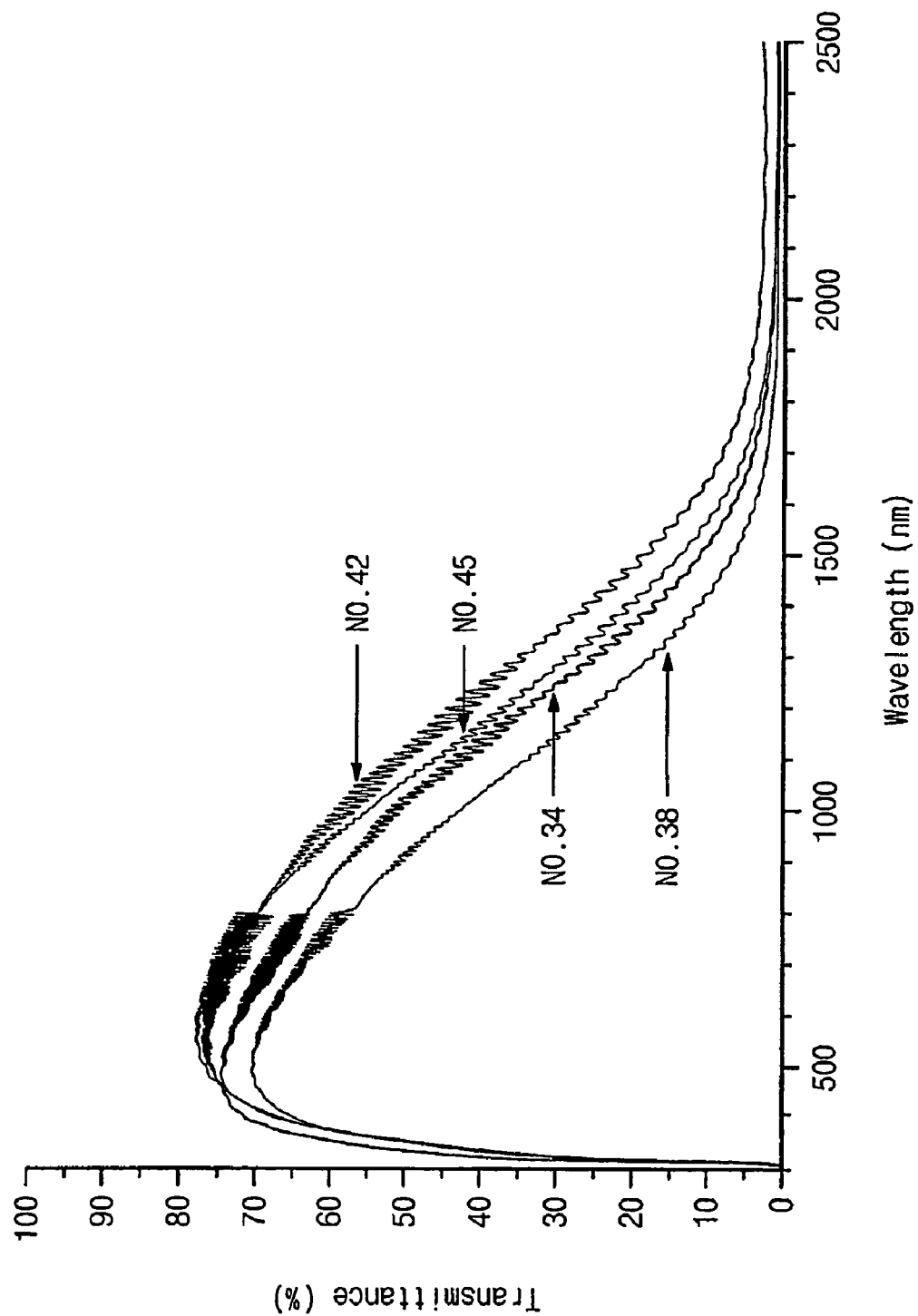
FIG. 3 illustrates a profile of light transmission spectrum for a coating film containing an ATO with different ration of Sb, which is obtained from Example 4.

FIG. 3 shows profiles of light transmission spectrums of the coating films for the samples #34, 38, 42 and 45 shown in Table 3. As illustrated, they show high performance of screening infrared rays and visible light transmission.

2) Microgravure Coating

A heat-ray cutoff film was obtained from that after coating a heat-ray cutoff coating compound in powder thickness of 1.7~3.0 μm by means of microgravure head #6H~9H, the solvent was evaporated by hot air for 30 seconds and then the coating film was hardened by being irradiated with a high-pressure mercury lamp, which can be powered up to 1000 mJ/cm, in a conveying velocity of 20 m/min. The following Table 4 arranges resulting data evaluated by the aforementioned test methods for the heat-ray cutoff films manufactured by the above processes.

TABLE 4

[Microgravure coated heat-ray cutoff films]

| Sample No. | ATO (Vol %) | Resin Binder (Vol %) | Conveying velocity | Cell # | VLT | IR-C | Adhesion | Pencil Intensity | Sub. | Pres. stability |
|---|---|---|---|---|---|---|---|---|---|---|
| 46 | 4.43 | 9.09 | 40 m/min | 6H | 75.1 | 71.8 | 0 | 2H↑ | PET | 0 |
| 47 | | | | 9H | 70.4 | 78.9 | 0 | 2H↑ | PET | 0 |

Figure 4:
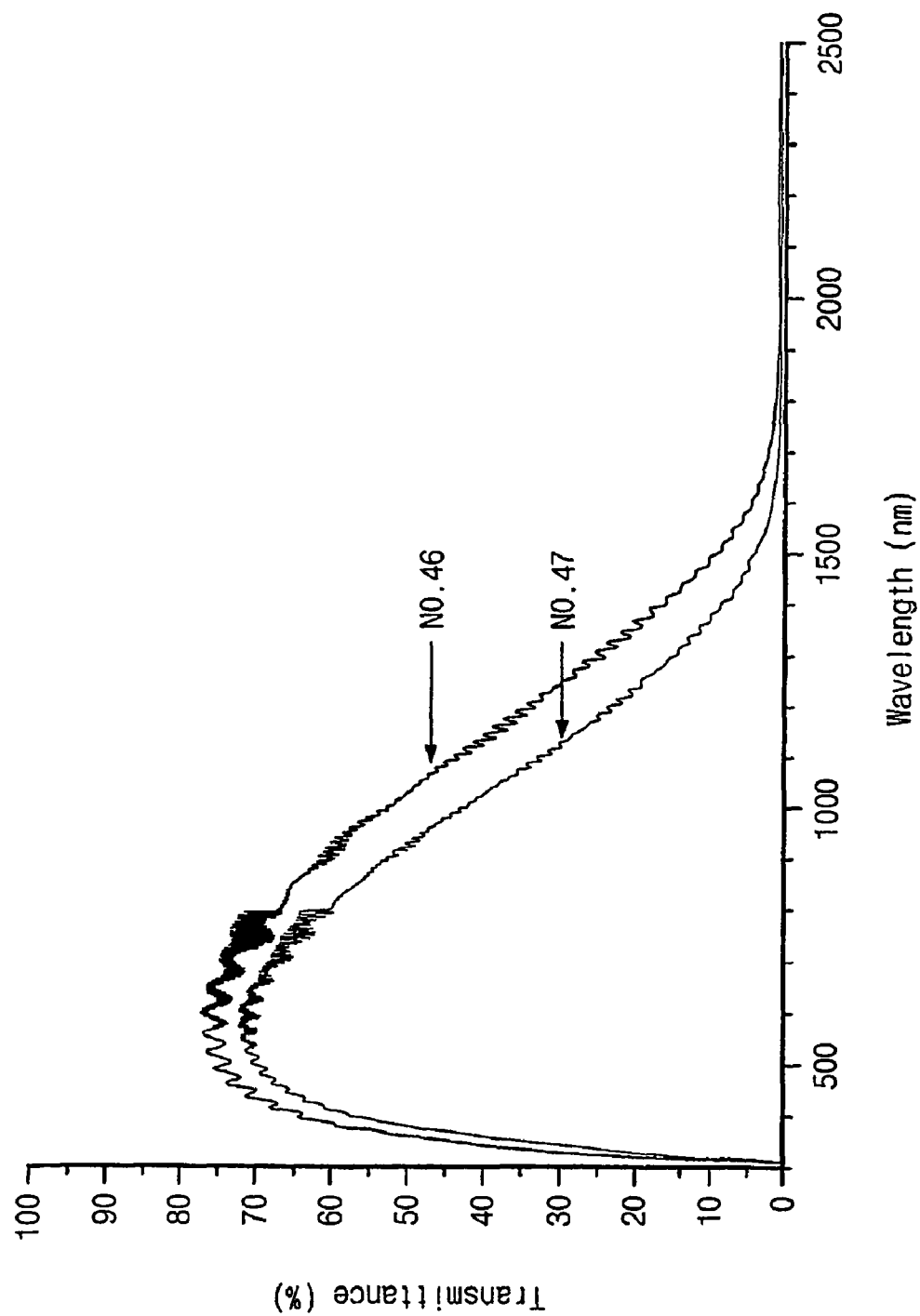
FIG. 4 illustrates a profile of light transmission spectrum for a cohesive film containing an ATO, which is obtained from Example 4.

FIG. 4 shows profiles of light transmission spectrums of the coating films for the samples #46 and 47 shown in Table 4. As illustrated, they show high performance of screening infrared rays and visible light transmission.

Figure 5:
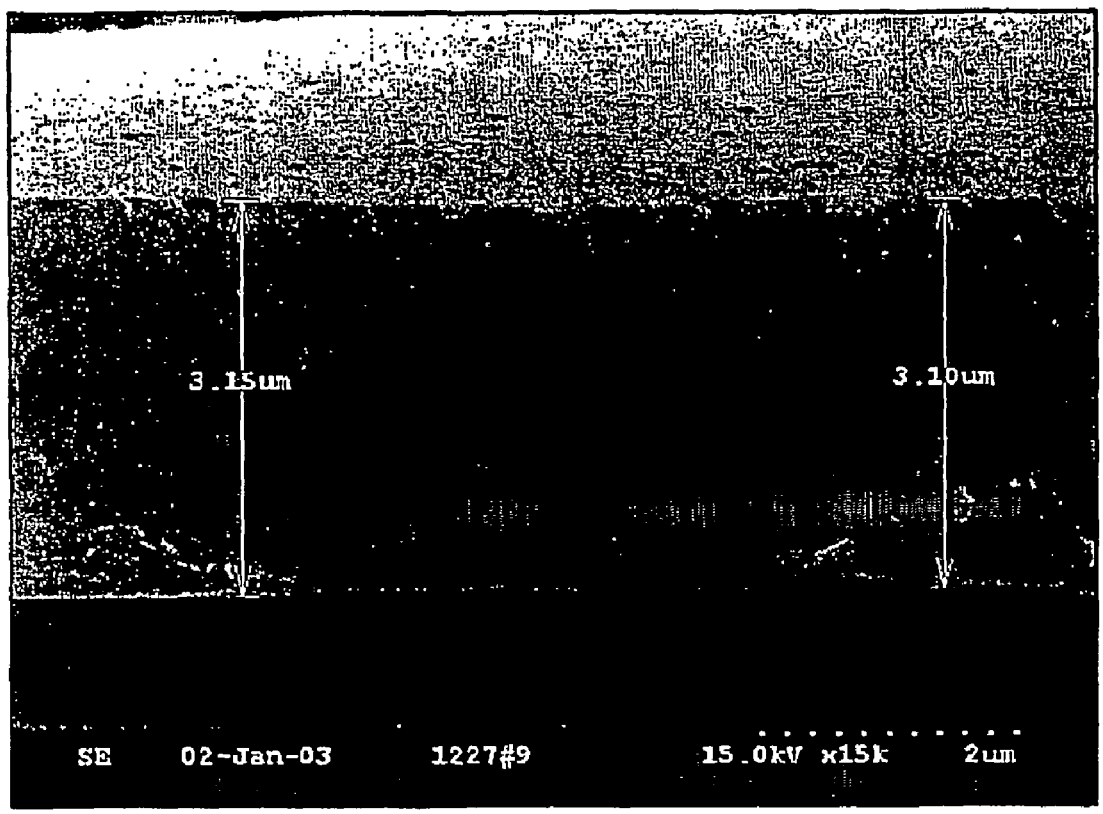
FIG. 5 illustrates a microscopic view, by a scanning electron microscopy (SEM), of a heat-ray cutoff coating film containing conductive nanoparticles, which is obtained from Example 4.

FIG. 5 is a photograph by a scanning electron microscopy, obtained from the results of Example 4, showing heat-ray cutoff films with thickness of 3.10 μm through 3.15 μm.

Example 5

A heat hardening heat-ray cutoff coating solution was obtained by uniformly mixing the ATO nanoparticles dispersion sol of Example 3 with a hardening deposition film, which had been made from an a heat hardening resin of acrylylate series, in an agitator, after adjusting a volume ratio on ATO: binder=15:85~80:20.

Example 6

A normal-temperature hardening heat-ray cutoff coating solution was obtained by uniformly mixing the ATO nanoparticles dispersion sol of Example 3 with a normal-temperature hardening resin binder, which had been made by solving a polyvinylalcohol into distilled water or an alcohol, in an agitator

INDUSTRIAL APPLICABILITY

The heat-ray cutoff films according to the present invention are effective in screening heat is advantageous to be associated with means for preventing malfunctions of integrated circuits or electronic components, or for reducing the costs for cooling and heating by lessening the amount of solar energy going in and out of rooms and automobiles through windows. In addition, it is possible to offer effects of cutoff infrared rays when they are applied to various products such as optical fibers, sun visors, PET vessels, packaging films, glasses, textile goods, peep holes of heaters, heating apparatuses, and so on.

The heat-ray cutoff films according to the present invention are advantageous to retaining the freshness of drinking waters, especially during the summer season, because they protect infrared rays when they attaches to vessels containing the drinking waters.

Furthermore, the heat-ray cutoff films according to the present invention provides effects of retarding the temperature falling of beverages or foods, because they protect infrared rays when they attaches to vessels containing the beverages or the foods.

What is claimed is:

1. A compound for producing a heat-ray cutoff film, comprising:
   a dispersion sol including conductive nanoparticles uniformly dispersed in a solvent formed essentially of an amphiphilic material and a surface charge mediating agent, the surface charge mediating agent providing the conductive nanoparticles with a same type of surface charge and an electrical double layer formed of counter ions surrounding the conductive nanoparticles; and
   a resin binder selected from an alkyd, a polyvinylalcohol, a polybutylalcohol, an acrylic, an acrylstyrene, a superacid vinyl, a polyvinylbutyral, a polyvinylacetal, a polycarbonate, a polychloride vinyl, a urethane, a melamine, a polyester, an epoxy, an epoxy acrylate, a polyether acrylate, a polyester acrylate, or a urethane-metamorphosed acrylate, the resin binder being in a range of about 5 to 40 wt % relative to the compound,
   wherein the solvent with the conductive nanoparticles dispersed therein has amphiphilic properties, the surface charge mediating agent is selected from acetic acid, glacial acetic acid, hydrochloric acid, nitric acid, phosphoric acid, sulfuric acid, or polyacrylic acid, the solvent includes ethylene glycol monomethyl ether, ethylene glycol monoethyl ether, ethylene glycol monopropyl ether, or ethylene glycol monobutyl ether, and the conductive nanoparticles are present in an amount of at least 20 wt % relative to the dispersion sol.

2. The compound according to claim 1, wherein the conductive nanoparticles include at least one of ATO, ITO, and AZO.

3. The compound according to claim 1, wherein the conductive nanoparticles have diameters under 200 nm, and the solvent is present in a range of about 20 to 80 wt % relative to the dispersion sol.

4. The compound according to claim 1, wherein the conductive nanoparticles are ATO nanoparticles containing about 5 to 20 wt % Sb, and the surface charge mediating agent is present in a range of about $5 \times 10^{-4}$ to $3.5 \times 10^{-3}$ g.

5. The compound according to claim 1, further comprising:
   a dispersing agent having hydrocarbon entities and at least one functional group with an affinity for the conductive nanoparticles so as to facilitate an adhesion of the dispersing agent to surfaces of the conductive nanoparticles, thereby stabilizing the conductive nanoparticles.

6. The compound according to claim 5, wherein the dispersing agent is present in a range of about 1 to 30 wt % relative to the dispersion sol, the dispersing agent selected from a dispersing agent containing an amine radical, a dispersing agent containing an acid radical, or a neutral dispersing agent.

7. The compound according to claim 5, wherein the conductive nanoparticles have diameters under 200 nm, and the solvent is present in a range of about 20 to 80 wt % relative to the dispersion sol.

8. The compound according to claim 7, wherein the conductive nanoparticles are ATO nanoparticles containing about 5 to 20 wt % Sb, and the surface charge mediating agent is present in a range of about $5 \times 10^{-4}$ to $3.5 \times 10^{-3}$ g.

9. The compound according to claim 7, wherein the dispersing agent is present in a range of about 1 to 30 wt % relative to the dispersion sol, the dispersing agent selected from a dispersing agent containing an amine radical, a dispersing agent containing an acid radical, or a neutral dispersing agent.

10. A method of forming a heat-ray cutoff film, comprising:
uniformly dispersing conductive nanoparticles in a solvent to form a dispersion sol, the solvent formed essentially of an amphiphilic material;
adjusting surface charges of the conductive nanoparticles with a surface charge mediating agent, the surface charge mediating agent providing the conductive nanoparticles with a same type of surface charge and an electrical double layer formed of counter ions surrounding the conductive nanoparticles;
mixing the dispersion sol with a resin binder selected from an alkyd, a polyvinylalcohol, a polybutylalcohol, an acrylic, an acrylstyrene, a super-acid vinyl, a polyvinylbutyral, a polyvinylacetal, a polycarbonate, a polychloride vinyl, a urethane, a melamine, a polyester, an epoxy, an epoxy acrylate, a polyether acrylate, a polyester acrylate, or a urethane-metamorphosed acrylate to obtain a mixed composite, the resin binder being in a range of about 5 to 40 wt % relative to the mixed composite; and
depositing the mixed composite on a substrate and hardening the deposited composite with a chemical ray using ultraviolet radiation, an electronic ray, or heat,
wherein the solvent with the conductive nanoparticles dispersed therein has amphiphilic properties, and the surface charge mediating agent is selected from acetic acid, glacial acetic acid, hydrochloric acid, nitric acid, phosphoric acid, sulfuric acid, or polyacrylic acid, the solvent includes ethylene glycol monomethyl ether, ethylene glycol monoethyl ether, ethylene glycol monopropyl ether, or ethylene glycol monobutyl ether, and the conductive nanoparticles are present in an amount of at least 20 wt % relative to the dispersion sol.

11. The method according to claim 10, wherein the conductive nanoparticles have diameters under 200 nm, and the solvent is present in a range of about 20 to 80 wt % relative to the dispersion sol.

12. The method according to claim 10, wherein the conductive nanoparticles are dispersed in the solvent by means of a dispersing agent having hydrocarbon entities and at least one functional group with an affinity for the conductive nanoparticles so as to facilitate an adhesion of the dispersing agent to surfaces of the conductive nanoparticles, thereby stabilizing the conductive nanoparticles.

13. The method according to claim 12, wherein:
the conductive nanoparticles are ATO nanoparticles containing about 5 to 20 wt % Sb;
the surface charge mediating agent is present in a range of about $5\times10^{-4}$ to $3.5\times10^{-3}$ g; and
the dispersing agent is present in a range of about 1 to 30 wt % relative to the dispersion sol, the dispersing agent selected from a dispersing agent containing an amine radical, a dispersing agent containing an acid radical, or a neutral dispersing agent.

14. The method according to claim 10, wherein:
the substrate comprises one of glass, a ceramic, a plastic, a metal, and a product of these; and
the mixed composite is formed in a plastic condition at a temperature of about 50 to 500° C.

15. The method according to claim 10, wherein the substrate is a polycarbonate resin, a poly (metha) acrylylester resin, a saturated fatty acid, or a cyclo-olefin resin, the substrate hardened by ultraviolet radiation.

16. The method according to claim 15, wherein the substrate is exposed to ultraviolet radiation in the range of about 500 to 1500 mJ/cm, while the substrate is conveyed at a velocity of about 15 to 50 m/min.

17. A method of screening heat rays, comprising:
attaching a heat-ray cutoff film on a vessel, the heat-ray cutoff film formed from a dispersion sol including conductive nanoparticles uniformly dispersed in a solvent formed essentially of an amphiphilic material, a surface charge mediating agent, and a resin binder, the surface charge mediating agent providing the conductive nanoparticles with a same type of surface charge and an electrical double layer formed of counter ions surrounding the conductive nanoparticles, the resin binder selected from an alkyd, a polyvinylalcohol, a polybutylalcohol, an acrylic, an acrylstyrene, a super-acid vinyl, a polyvinylbutyral, a polyvinylacetal, a polycarbonate, a polychloride vinyl, a urethane, a melamine, a polyester, an epoxy, an epoxy acrylate, a polyether acrylate, a polyester acrylate, or a urethane-metamorphosed acrylate, the resin binder being in a range of about 5 to 40 wt % relative to the dispersion sol,
wherein the solvent with the conductive nanoparticles dispersed therein has amphiphilic properties, the surface charge mediating agent is selected from acetic acid, glacial acetic acid, hydrochloric acid, nitric acid, phosphoric acid, sulfuric acid, or polyacrylic acid, the solvent includes ethylene glycol monomethyl ether, ethylene glycol monoethyl ether, ethylene glycol monopropyl ether, or ethylene glycol monobutyl ether, and the conductive nanoparticles are present in an amount of at least 20 wt % relative to the dispersion sol.

18. A method of screening heat rays with a heat-ray cutoff film, comprising:
forming a compound including a dispersion sol with conductive nanoparticles uniformly dispersed in a solvent formed essentially of an amphiphilic material, wherein the solvent with the conductive nanoparticles dispersed therein has amphiphilic properties;
adjusting surface charges of the conductive nanoparticles with a surface charge mediating agent, the surface charge mediating agent providing the conductive nanoparticles with a same type of surface charge and an electrical double layer formed of counter ions surrounding the conductive nanoparticles;
mixing the compound with a resin binder selected from an alkyd, a polyvinylalcohol, a polybutylalcohol, an acrylic, an acrylstyrene, a super-acid vinyl, a polyvinylbutyral, a polyvinylacetal, a polycarbonate, a polychloride vinyl, a urethane, a melamine, a polyester, an epoxy, an epoxy acrylate, a polyether acrylate, a polyester acrylate, or a urethane-metamorphosed acrylate to obtain a mixed composite, the resin binder being in a range of about 5 to 40 wt % relative to the compound;
depositing the mixed composite on a substrate and hardening the deposited composite with a chemical ray using ultraviolet radiation, an electronic ray, or heat to form the heat-ray cutoff film; and
coating the heat-ray cutoff film on a surface of a vessel,
wherein the surface charge mediating agent is selected from acetic acid, glacial acetic acid, hydrochloric acid, nitric acid, phosphoric acid, sulfuric acid, or polyacrylic acid, the solvent includes ethylene glycol monomethyl ether, ethylene glycol monoethyl ether, ethylene glycol monopropyl ether, or ethylene glycol monobutyl ether, and the conductive nanoparticles are present in an amount of at least 20 wt % relative to the dispersion sol.

19. The method according to claim 18, wherein the conductive nanoparticles have diameters under 200 nm, and the solvent is present in a range of about 20 to 80 wt % relative to the dispersion sol.

20. The method according to claim 18, wherein the conductive nanoparticles are dispersed in the solvent by means of a dispersing agent having hydrocarbon entities and at least one functional group with an affinity for the conductive nanoparticles so as to facilitate an adhesion of the dispersing agent to surfaces of the conductive nanoparticles, thereby stabilizing the conductive nanoparticles.

21. The method according to claim 20, wherein:
the conductive nanoparticles are ATO nanoparticles containing about 5 to 20 wt % Sb;
the surface charge mediating agent is present in a range of about $5\times10^{-4}$ to $3.5\times10^{-3}$ g; and
the dispersing agent is present in a range of about 1 to 30 wt % relative to the dispersion sol, the dispersing agent selected from a dispersing agent containing an amine radical, a dispersing agent containing an acid radical, or a neutral dispersing agent.

22. The method according to claim 18, wherein the substrate is a polycarbonate resin, a poly (metha) acrylylester resin, a saturated fatty acid, or a cyclo-olefin resin, the substrate hardened by ultraviolet radiation.

23. The method according to claim 18, wherein the vessel is made of a metal, a ceramic, or a plastic, containing drinking waters or foods.

* * * * *

UNITED STATES PATENT AND TRADEMARK OFFICE
CERTIFICATE OF CORRECTION

| | | |
|---|---|---|
| PATENT NO. | : 8,038,786 B2 | Page 1 of 1 |
| APPLICATION NO. | : 10/521025 | |
| DATED | : October 18, 2011 | |
| INVENTOR(S) | : Hae-Wook Lee et al. | |

It is certified that error appears in the above-identified patent and that said Letters Patent is hereby corrected as shown below:

ON THE TITLE PAGE:

Item (86) should read, PCT No.:    PCT/KR2003/00516

Signed and Sealed this
Thirty-first Day of January, 2012

David J. Kappos
*Director of the United States Patent and Trademark Office*